US007818360B2

(12) United States Patent
Wang et al.

(10) Patent No.: US 7,818,360 B2
(45) Date of Patent: Oct. 19, 2010

(54) PROCESSOR AND METHOD FOR PERFORMING A FAST FOURIER TRANSFORM AND/OR AN INVERSE FAST FOURIER TRANSFORM OF A COMPLEX INPUT SIGNAL

(75) Inventors: Zhongjun Wang, Singapore (CN); Lee Guek Yeo, Singapore (CN); Wenzhen Li, Singapore (CN); Yanxin Yan, Singapore (CN); Yujing Ting, Singapore (CN); Masayuki Tomisawa, Singapore (CN)

(73) Assignee: Oki Techno Centre (Singapore) Pte Ltd., Singapore (SG)

( * ) Notice: Subject to any disclaimer, the term of this patent is extended or adjusted under 35 U.S.C. 154(b) by 970 days.

(21) Appl. No.: 11/643,936

(22) Filed: Dec. 22, 2006

(65) Prior Publication Data

US 2007/0192394 A1    Aug. 16, 2007

(30) Foreign Application Priority Data

Dec. 30, 2005   (SG)   .............................. 200508580-8

(51) Int. Cl.
G06F 17/14   (2006.01)
(52) U.S. Cl. ..................................................... 708/404
(58) Field of Classification Search ........................ None
See application file for complete search history.

(56) References Cited

U.S. PATENT DOCUMENTS

| 5,297,070 | A | 3/1994 | Hua et al. | |
| 6,098,088 | A | 8/2000 | He et al. | |
| 2002/0083107 | A1* | 6/2002 | Park et al. ................... | 708/404 |
| 2004/0059766 | A1* | 3/2004 | Yeh ............................. | 708/406 |
| 2005/0138098 | A1* | 6/2005 | Saha et al. ................... | 708/404 |
| 2005/0259565 | A1* | 11/2005 | Fujii et al. ................... | 370/203 |
| 2006/0129620 | A1* | 6/2006 | Lee et al. ..................... | 708/404 |
| 2007/0226286 | A1* | 9/2007 | Kang ........................... | 708/404 |

FOREIGN PATENT DOCUMENTS

| JP | 2005/065231 A | 3/2005 |
| KR | 2003/0054300 A | 7/2003 |

* cited by examiner

*Primary Examiner*—David H Malzahn
(74) *Attorney, Agent, or Firm*—Venable LLP; Michael A. Sartori

(57) ABSTRACT

A processor for performing a Fast Fourier Transform and/or an Inverse Fast Fourier Transform of a complex input signal comprises a first stage for passing the input signal to a second stage when a Fast Fourier Transform procedure is to be performed and for swapping the real and imaginary components of the complex input signal before passing the signal to the second stage if an Inverse Fast Fourier Transform procedure is to be performed. The second stage has first and second radix-4 butterfly elements. A third stage is arranged to switch between first and second operating modes, the second operating mode being for processing a complex conjugate symmetrical input signal. A fourth stage has a plurality of processing units, one or more of the processing units comprising a radix-2 pipelined Fast Fourier Transform processor. The first and second radix-4 butterfly elements are arranged to perform a butterfly operation on the complex input signal to generate and deliver one or more components of a processed signal to the fourth stage. The fourth stage is arranged to process the processed signal received from the first stage according to a Fast Fourier Transform processing procedure to produce an output signal. There is also disclosed a method for performing a Fast Fourier Transform and/or Inverse Fast Fourier Transform of a complex input signal.

21 Claims, 5 Drawing Sheets

PROCESSOR AND METHOD FOR PERFORMING A FAST FOURIER TRANSFORM AND/OR AN INVERSE FAST FOURIER TRANSFORM OF A COMPLEX INPUT SIGNAL

FIELD OF THE INVENTION

The present invention relates generally to a method and processor for performing a Fast Fourier Transform (FFT) and/or an Inverse Fast Fourier Transform (IFFT) of a complex input signal, and in particular to a system and method for providing a high-speed, low-complexity and low-power VLSI implementation of a processor for orthogonal frequency-division multiplexing (OFDM) communication applications.

BACKGROUND OF THE INVENTION

In an orthogonal frequency-division multiplexing (OFDM) communication system, the high-rate signal is transformed into a number of orthogonal components for lower rate processing. This is usually achieved by using a Fast Fourier Transform and Inverse Fast Fourier Transform (FFT/IFFT) pair. The Fast Fourier Transform and Inverse Fast Fourier Transform are frequently applied in communications systems due to their efficiency in OFDM applications.

In the OFDM based ultra wide-band (UWB) system proposed by the MultiBand OFDM Alliance (MBOA), a 128-point IFFT is used in the transmitter to map 128-point frequency-domain complex values to a time-domain OFDM symbol. This is described in the publication by the MultiBand OFDM Alliance (MBOA) Special Interest Group (SIG)/ WiMedia Alliance, Inc. (WiMedia) in www.wimedia.com entitled "MultiBand OFDM Physical Layer Proposal for IEEE 802.15.3a," September 2004. In the receiver side of such a conventional system, a 128-point FFT is performed to convert each time-domain OFDM symbol back into 128 frequency-domain complex values.

For many applications, the FFT/IFFT processor can adopt a parallel architecture to satisfy the requirement of high-throughputs and low latencies. In a conventional OFDM UWB system, for example, the 128-point FFT/IFFT should be computed within the period of one OFDM symbol—312.5 ns. With the processing clock of 132 MHz, which is selected with practical interest, the 128-point processing should be completed within about 41 clock cycles. In this case, as many parallel processing elements as necessary to achieve the fast speed may be employed. However, this will greatly increase the hardware complexity which is not generally acceptable and should be avoided in practice.

A fundamental computational element of the FFT is a "butterfly element" which, in its simplest form (radix-2) transforms two complex values into two other complex values. The butterfly element is used to perform multiple calculations in the different stages of the transform resulting in the synthesis from the time domain to the frequency domain or vice versa.

Various pipeline techniques have been proposed over the last three decades for achieving real-time FFT/IFFT processing. These include the R2MDC (Radix-2 Multi-path Delay Commutator), R2SDF (Radix-2 Single-path Delay Feedback), R2²SDF, and other Radix-4 based techniques. An overview and comparison of these techniques are described in the publication by S. He and M. Torkelson entitled "Designing pipeline FFT processor for OFDM (de)modulation," which was published in Proc. IEEE URSI Int Symp. Signals, Syst., Electron., September 1998, pp. 257-262. In general, the aim behind these techniques is to reduce the implementation complexity as much as possible while real-time, non-stop processing of the input data sequence is maintained. In this context, real-time pipeline processing means that the processing clock rate is equal to the sampling rate. However, in the OFDM UWB system, the sampling rate is prescribed as 528 MHz, which is much higher than the processing clock rate of 132 MHz. This problem may be solved by introducing the parallel and pipeline processing together such that the integrated processing has the advantages of both architectures. In this way, a good compromise between processing speed and implementation complexity can be achieved.

A basic parallel-pipeline FFT processor which is pipelined with the R2SDF scheme is described in the publication by E. H. Wold and A. M. Despain entitled "Pipeline and parallel-pipeline FFT processors for VLSI implementation," published as IEEE Trans. Comput., vol. C-33, no. 5, pp. 414-426, May 1984.

To meet the requirement of very high throughput in the OFDM UWB system, a three-stage parallel pipelined architecture is described in the publication by H.-Y. Liu, et al., entitled "A 480 Mb/s LDPC-COFDM-based UWB baseband transceiver," published as IEEE 1SSCC Dig. Tech. Papers, pp. 444-445, Febuary, 2005. In this publication, a four-parallel architecture is adopted to implement the radix-2 FFT algorithm in Stage 1 and a radix-8 FFT algorithm is implemented using two different structures in Stage 2 and Stage 3.

There is a need for effective and efficient VLSI implementation of the IFFT/FFT processor in an OFDM UWB system. As the OFDM UWB system is targeted to provide very high data rate communication, the IFFT/FFT processor needs to satisfy the requirement of high-throughputs and low latencies, as well as being economical and having low power consumption whilst at the same time being high speed and area efficient.

SUMMARY OF THE INVENTION

According to a first aspect of the present invention there is provided a processor for performing a Fast Fourier Transform (FFT) and/or an Inverse Fast Fourier Transform (IFFT) of a complex input signal having a real component and an imaginary component, the processor comprising:

a first stage for passing the input signal to a second stage when a Fast Fourier Transform procedure is to be performed and for swapping the real and imaginary components of the complex input signal before passing the signal to a second stage if an Inverse Fast Fourier Transform procedure is to be performed; the first stage having an input and an output;

the second stage comprising a first radix-4 butterfly element and a second radix-4 butterfly element; the output of the first stage being connectable to an input of the second stage;

a third stage for switching between a first operating mode and a second operating mode, the second operating mode being for processing a complex conjugate symmetrical input signal;

a fourth stage comprising a plurality of processing units to provide a processed signal comprising a real component and an imaginary component, one or more of said processing units comprising a radix-2 pipelined Fast Fourier Transform (FFT) processor;

a fifth stage for switching with the third stage between the first operating mode and the second operating mode; the fifth stage having an input couplable to an output of the fourth stage and an output;

a sixth stage for passing the signal received from the output of the fifth stage if a Fast Fourier Transform procedure is performed and for swapping the real and imaginary components of the signal received from the output of the fifth stage before passing the signal to an output of the sixth stage if an Inverse Fast Fourier Transform procedure is performed; wherein:

a first input to the third stage being couplable to an output of the first butterfly element; a first output to the third stage being couplable to a first input of one or more of the plurality of processing units; and a second input to one or more of the plurality of processing units being couplable through the third stage to an output of the second butterfly element;

the first and second radix-4 butterfly elements being arranged to perform a butterfly operation on the complex input signal to generate and deliver one or more components of a processed signal to the fourth stage through the third stage;

the fourth stage being arranged to process the processed signal received from the third stage according to a Fast Fourier Transform (FFT) processing procedure to produce an output signal.

Preferably, the fourth stage comprises a first processing unit, and a second processing unit.

In a further preferred embodiment, the fourth stage further comprises a third processing unit, and a fourth processing unit.

Preferably, two or more of the processing units of the fourth stage are identical. In a preferred embodiment, one or more of the processing units comprise a plurality of cascaded radix-2 butterfly elements.

Preferably, one or more of the plurality of cascaded radix-2 butterfly elements have one or more shift register memories, and two or more of the plurality of radix-2 butterfly elements may be separated by a multiplier stage. In a preferred embodiment, two or more of the plurality of radix-2 butterfly elements are separated by an imaginary unit stage.

In a further preferred embodiment, where the input signal is a complex conjugate symmetrical signal, the third stage of the processor further comprises:

a first multiplier stage, the first multiplier stage being arranged to receive a first output signal from the first butterfly element;

a first summing stage, the first summing stage being arranged to receive an output signal from the first multiplier stage and to add the output signal from the first multiplier stage to a second output signal from the first butterfly element to form a first summed signal; wherein the first processing unit has a first input for receiving the first summed signal;

a second multiplier stage, the second multiplier stage being arranged to receive a first output signal from the second butterfly element;

a second summing stage, the second summing stage being arranged to receive an output signal from the second multiplier stage and to add the output signal from the second multiplier stage to a second output signal from the second butterfly element to form a second summed signal; wherein the first processing unit has a second input for receiving the second summed signal.

Preferably, the third stage of the processor further comprises:

a third multiplier stage, the third multiplier stage being arranged to receive a third output signal from the first butterfly element;

a third summing stage, the third summing stage being arranged to receive an output signal from the third multiplier stage and to add the output signal from the third multiplier stage to a fourth output signal from the first butterfly element to form a third summed signal; wherein the second processing unit has a first input for receiving the third summed signal;

a fourth multiplier stage, the fourth multiplier stage being arranged to receive a third output signal from the second butterfly element;

a fourth summing stage, the fourth summing stage being arranged to receive an output signal from the fourth multiplier stage and to add the output signal from the fourth multiplier stage to a fourth output signal from the second butterfly element to form a fourth summed signal; wherein the second processing unit has a second input for receiving the fourth summed signal.

Preferably, the fifth stage is arranged to select the real component and the imaginary component from the processed signal output of the first processing unit and the real component and the imaginary component from the processed signal output of the second processing unit, the selected real and imaginary components forming the outputs from the processor.

According to a second aspect of the present invention there is provided a method for performing a Fast Fourier Transform (FFT) and/or an Inverse Fast Fourier Transform (IFFT) of a complex input signal having a real component and an imaginary component, the method comprising:

applying the complex input signal to a first stage and when a Fast Fourier Transform procedure is to be applied passing the input signal to a second stage, and when an Inverse Fast Fourier Transform procedure is to be applied swapping the real and imaginary components of the complex input signal before passing the signal to a second stage;

applying in a second stage a first portion of the signal output from the first stage to a radix-4 butterfly element;

applying in the second stage a second portion of the signal output from the first stage to a second radix-4 butterfly element;

performing a butterfly operation in each of the first and second radix-4 butterfly elements on the respective portions of the signal to generate in each of the butterfly elements a processed output signal;

applying the processed output signal from the first butterfly element to a first input to a third stage, the third stage being arranged to switch between a first operating mode and a second operating mode, the second operating mode being for processing a complex conjugate symmetrical input signal;

applying the processed output signal from the second butterfly element to a second input to the third stage;

applying an output signal from the third stage derived from the first output from the first butterfly element to a first input to one or more of a plurality of processing units in a fourth stage, one or more of said processing units comprising a radix-2 pipelined Fast Fourier Transform (FFT) processor; and applying an output signal from the third stage derived from the first output from the second butterfly element to a second input to one or more of the plurality of processing units;

processing in the fourth stage the processed output signals received from the first and second butterfly elements according to a Fast Fourier Transform (FFT) processing procedure to produce a processed output signal;

applying the processed output signal to a fifth stage arranged for switching with the third stage between the first operating mode and the second operating mode;

applying the signal output from the fifth stage to a sixth stage, passing the signal output from the fifth stage to an output of the sixth stage if a Fast Fourier Transform procedure is performed and swapping the real and imaginary component of the complex signal output from the fifth stage before passing the signal to an output of the sixth stage if an Inverse Fast Fourier Transform is performed to produce an output signal.

Preferably, the step of applying the output signals from the first and second butterfly elements comprises applying the output signals to a first processing unit and a second processing unit.

Preferably, the step of applying the output signals from the first and second butterfly elements further comprises applying the output signals to a third processing unit, and a fourth processing unit.

In a preferred embodiment, the step of applying the processed output signals to one or more of a plurality of processing units comprises applying the signals to two or more identical processing units.

Preferably, the step of applying the processed output signals to one or more of a plurality of processing units comprises applying the signals to one or more of the processing units comprising a plurality of cascaded radix-2 butterfly elements, and further comprising applying a-signal output from one or more of the plurality of cascaded radix-2 butterfly elements to one or more shift register memories.

Preferably, the method further comprises multiplying the signal output from one or more of the plurality of radix-2 butterfly elements by a predetermined factor before applying it to a further one of said radix-2 butterfly elements, and the signal output from one or more of the plurality of radix-2 butterfly elements may be multiplied by an imaginary unit before applying it to a further one of said radix-2 butterfly elements.

In a preferred embodiment, the input signal is a complex conjugate symmetrical signal, and the step of applying to the third stage further comprises:

applying a first output signal from the first butterfly element to a first multiplier stage;

applying to a first summing stage an output signal from the first multiplier stage;

adding the output signal from the first multiplier stage to a second output signal from the first butterfly element to form a first summed signal;

applying the first summed signal to a first input of the first processing unit;

applying a first output signal from the second butterfly element to a second multiplier stage;

applying to a second summing stage an output signal from the second multiplier stage;

adding the output signal from the second multiplier stage to a second output signal from the second butterfly element to form a second summed signal; and applying the second summed signal to a second input of the first processing unit.

Preferably, the step of applying to the third stage further comprises:

applying to a third multiplier stage a third output signal from the first butterfly element;

applying to a third summing stage an output signal from the third multiplier stage;

adding the output signal from the third multiplier stage to a third output signal from the first butterfly element to form a third summed signal;

applying to a first input of the second processing unit the third summed signal;

applying to a fourth multiplier stage a third output signal from the second butterfly element;

applying to a fourth summing stage an output signal from the fourth multiplier stage;

adding the output signal from the fourth multiplier stage to a fourth output signal from the second butterfly element to form a fourth summed signal; and applying to a second input of the second processing unit the fourth summed signal.

In a further preferred embodiment, the method further comprises selecting in the fifth stage the real component and the imaginary component from the processed signal output from the first processing unit and the real component and the imaginary component from the processed signal output from the second processing unit, the selected real and imaginary components forming output signals.

One or more preferred embodiments of the present invention thereby provide a compact, mixed-radix, highly parallel and pipelined architecture. Furthermore, in a preferred embodiment, when the input data of the IFFT/FFT are complex conjugate symmetrical, a considerable amount of power saving may be achieved with addition of a simple control mechanism to the processor. This is particularly advantageous as low power consumption is extremely desirable in a high speed wireless OFDM communication system.

BRIEF DESCRIPTION OF THE DRAWINGS

The present invention will now be described by way of example and with reference to the accompanying drawings in which:

FIG. 1b is a schematic diagram showing the real/imaginary swap circuit (RIS) used in the architecture of FIG. 1a;

FIG. 1c is a schematic diagram showing the separation of the real (Re) and imaginary (Im) components of the complex signal (a+jb) which acts as the input signal to the architecture of FIG. 1a;

FIG. 2 is a schematic diagram showing the implementation of a 32-point radix-2 FFT processor unit having R2SDF pipelined architecture for use as a processing unit in the processor of FIG. 1a;

FIGS. 3a and 3b are schematic diagrams showing a radix-4 butterfly decomposition operation in a second stage in the processor of FIG. 1a.

DETAILED DESCRIPTION OF PREFERRED EMBODIMENTS

Figure 1A:
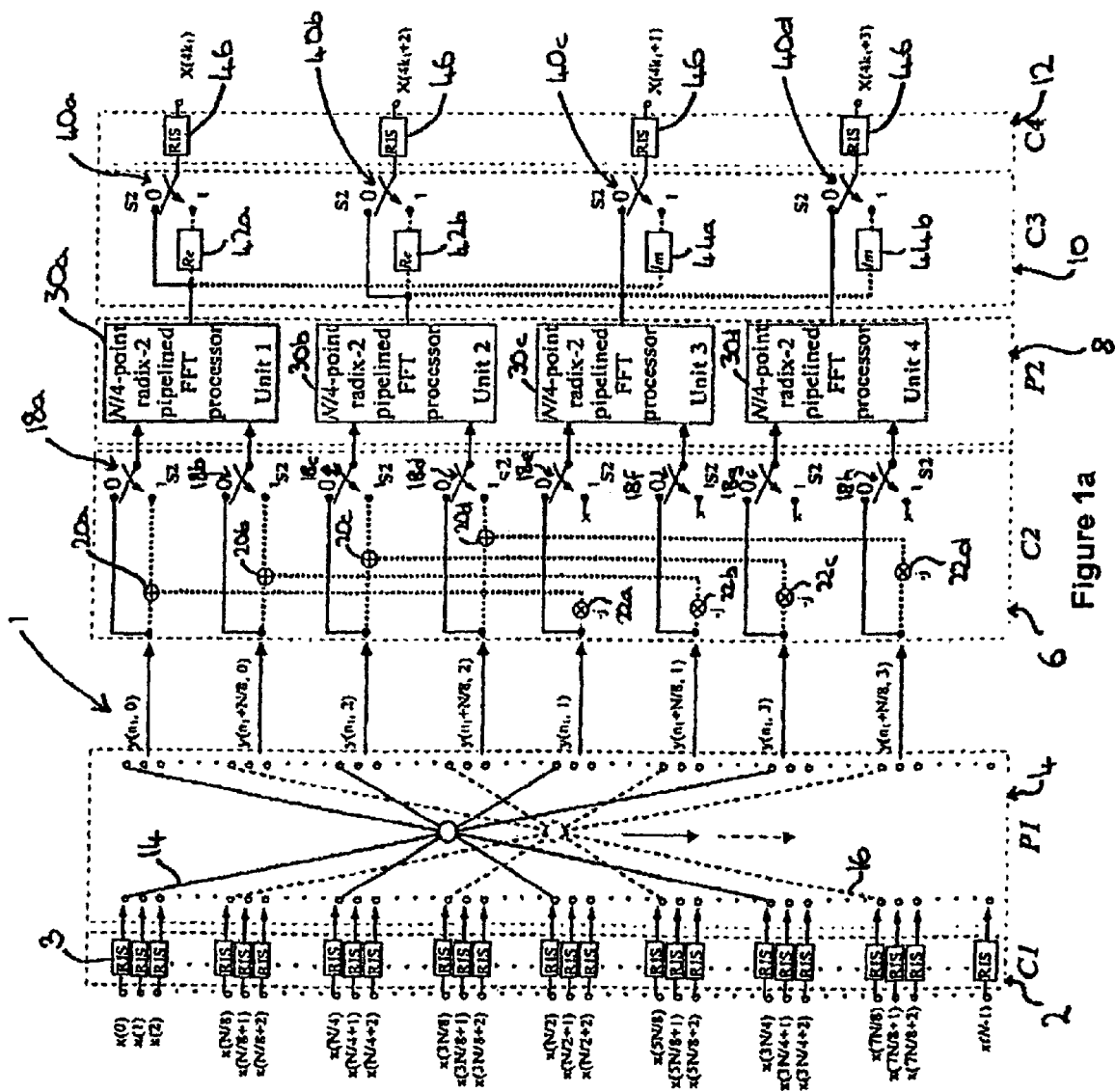
FIG. 1a is a schematic diagram showing the basic parallel and pipelined architecture for N-point FFT processor with $n_1=0$ to N/4 and $k_1=0$ to N/4 according to a first preferred embodiment of the invention.

A preferred embodiment of the present invention is shown in FIG. 1a. FIG. 1a shows a processor 1 according to a first preferred embodiment of the invention. The processor 1 comprises six stages 2, 4, 6, 8, 10, and 12. The first stage 2 comprises a plurality of real/imaginary swap (RIS) units 3, one unit 3 being connected to each of the N-point input values of the processor 1. The outputs of each RIS unit 3 are connected to corresponding inputs to the second stage 4. The second stage 4 comprises two radix-4 butterfly elements 14, 16 which split and convert the N-point output values of the first stage 2 into four groups. Each of the four inputs to the first butterfly element 14 is connected to the first N/8-points in each group of N/4-points in sequence. Each of the four inputs to the second butterfly element 16 is connected in sequence to the second group of N/8 points in each group of N/4 points. Each group of the data is then supplied sequentially to a respective input to the third stage 6.

The third stage 6 comprises eight inputs in four pairs of two inputs, one of each of the two inputs being outputs from the first butterfly element and the second of the two inputs being outputs from the second butterfly element. The third stage 6 comprises eight changeover switches 18a-18h, four summing stages 20a-20d and four multiplier stages 22a-22d.

The first output from the first butterfly 14 is connected to the first input to the third stage 6 and therein to a first contact of a first changeover switch 18a and also to a first input of a first summing stage 20a. The output of the first summing stage 20a is connected to a second contact on the first changeover switch 18a. The wiper of the first changeover switch 18a is connected to a first output of the third stage 6.

The first output from the second butterfly 16 is connected to the second input of the third stage 6 and therein to a first contact of a second changeover switch 18b and also to a first input of a second summing stage 20b. The output of the second summing stage 20b is connected to a second contact on the second changeover switch 18b. The wiper of the second changeover switch 18b is connected to a second output of the third stage 6.

The second output from the first butterfly 14 is connected to the third input to the third stage 6 and therein to a first contact of a third changeover switch 18c and also to a first input to a third summing stage 20c. The output of the third summing stage 20c is connected to a second contact on the third changeover switch 18c. The wiper of the third changeover switch 18c is connected to a third output of the third stage 6.

The second output from the second butterfly 16 is connected to the fourth input of the third stage 6 and therein to a first contact of a fourth changeover switch 18d and also to a first input to a fourth summing stage 20d. The output of the fourth summing stage 20d is connected to a second contact on the fourth changeover switch 18d. The wiper of the fourth changeover switch 18d is connected to a fourth output of the third stage 6.

The third output from the first butterfly 14 is connected to the fifth input to the third stage 6 and therein to a first contact of a fifth changeover switch 18e and also to the input of a first multiplier stage 22a. The output of the first multiplier stage 22a is connected to a second input to the first summing stage 20a. The wiper of the fifth changeover switch 18e is connected to a fifth output of the third stage 6. A second contact of the fifth changeover switch 18e is left open (disconnected).

The third output from the second butterfly 16 is connected to the sixth input of the third stage 6 and therein to a first contact of a sixth changeover switch 18f and also to the input of a second multiplier stage 22b. The output of the second multiplier stage 22b is connected to a second input to the second summing stage 20b. The wiper of the sixth changeover switch 18f is connected to a sixth output of the third stage 6. A second contact of the sixth changeover switch 18f is left open (disconnected).

The fourth output from the first butterfly 14 is connected to the seventh input to the third stage 6 and therein to a first contact of a seventh changeover switch 18g and also to the input to a third multiplier stage 22c. The output of the third multiplier stage 22c is connected to a second input to the third summing stage 20c. The wiper of the seventh changeover switch 18g is connected to a seventh output of the third stage 6. A second contact of the seventh changeover switch 18g is left open (disconnected).

The fourth output from the second butterfly 16 is connected to the eighth input of the third stage 6 and therein to a first contact of an eighth changeover switch 18h and also to the input to a fourth multiplier stage 22d. The output of the fourth multiplier stage 22d is connected to a second input to the fourth summing stage 20d. The wiper of the eighth changeover switch 18h is connected to an eighth output of the third stage 6. A second contact of the eighth changeover switch 18h is connected to ground.

The fourth stage 8 comprises four N/4-point parallel processing units 30a, 30b, 30c, 30d. Each processing unit 30a, 30b, 30c, 30d in the fourth stage 8 has two inputs and one output.

One input to the first processing unit 30a is connected to the first output of the third stage 6. The second input to the first processing unit 30a is connected to the second output of the third stage 6. Similarly, the first input to the second processing unit 30b is connected to the third output of the third stage 6, the second input to the second processing unit 30b is connected to the fourth output of the third stage 6, the first input to the third processing unit 30c is connected to the fifth output of the third stage 6, the second input to the third processing unit 30c is connected to the sixth output of the third stage 6, the first input to the fourth processing unit 30d is connected to the seventh output of the third stage 6, and the second input to the fourth processing unit. 30d is connected to the eighth output of the third stage 6.

Each processing unit 30a, 30b, 30c, 30d in the second stage 4 is a pipelined processor which performs N/4-point radix-2 DIF (decimation-in-frequency) in-place FFT and takes about 32 clock cycles when N=128.

The first output from the fourth stage 8 is connected to a first input to the fifth stage 10 and then to a first contact of a first changeover switch 40a in the fifth stage 10. The first input to the fifth stage 10 is also connected to a first selection stage 42a which is arranged to select the real (Re) component of the signal received from the first processing unit 30a. The output of first selection stage 42a is connected to a second contact of the first changeover switch 40a in the fifth stage 10 and the wiper thereof is connected to a first output of the fifth stage 10. The first input to the fifth stage 10 is also connected to the input of a second selection stage 44a which is arranged to select the imaginary (Im) component of the signal received from the first processing unit 30a.

The second output from the fourth stage 8 is connected to a second input to the fifth stage 10 and then to a first contact of a second changeover switch 40b in the fifth stage 10. The second input to the fifth stage 10 is also connected to a third selection stage 42b which is arranged to select the real (Re) component of the signal received from the second processing unit 30b. The output of third selection stage 42b is connected to a second contact of the second changeover switch 40b in the fifth stage 10 and the wiper thereof is connected to a second output of the fifth stage 10. The second input to the fifth stage 10 is also connected to the input of a fourth selection stage 44b which is arranged to select the imaginary (Im) component of the signal received from the second processing unit 30b.

The third output from the fourth stage 8 is connected to a third input to the fifth stage 10 and then to a first contact of a third changeover switch 40c in the fifth stage 10. The second contact of the third changeover switch 40c is connected to the output of the second selection stage 44a which is arranged to select the imaginary (Im) component of the signal received from the first processing unit 30a. The wiper of the third changeover switch 40c in the fifth stage 10 is connected to a third output of the fifth stage 10.

The fourth output from the fourth stage 8 is connected to a fourth input to the fifth stage 10 and then to a first contact of a fourth changeover switch 40d in the fifth stage 10. The second contact of the fourth changeover switch 40d is connected to the output of the fourth selection stage 44b which is arranged to select the imaginary (Im) component of the signal received from the second processing unit 30b. The wiper of the fourth changeover switch 40d in the fifth stage 10 is connected to a fourth output of the fifth stage 10.

Each output from the fifth stage 10 is connected to a respective input to the sixth stage 12. Each input to the sixth stage 12 is connected to the input of a real/imaginary swap stage 46 and the outputs of these swap stages are connected to the outputs of the sixth stage 12.

Figure 1B:
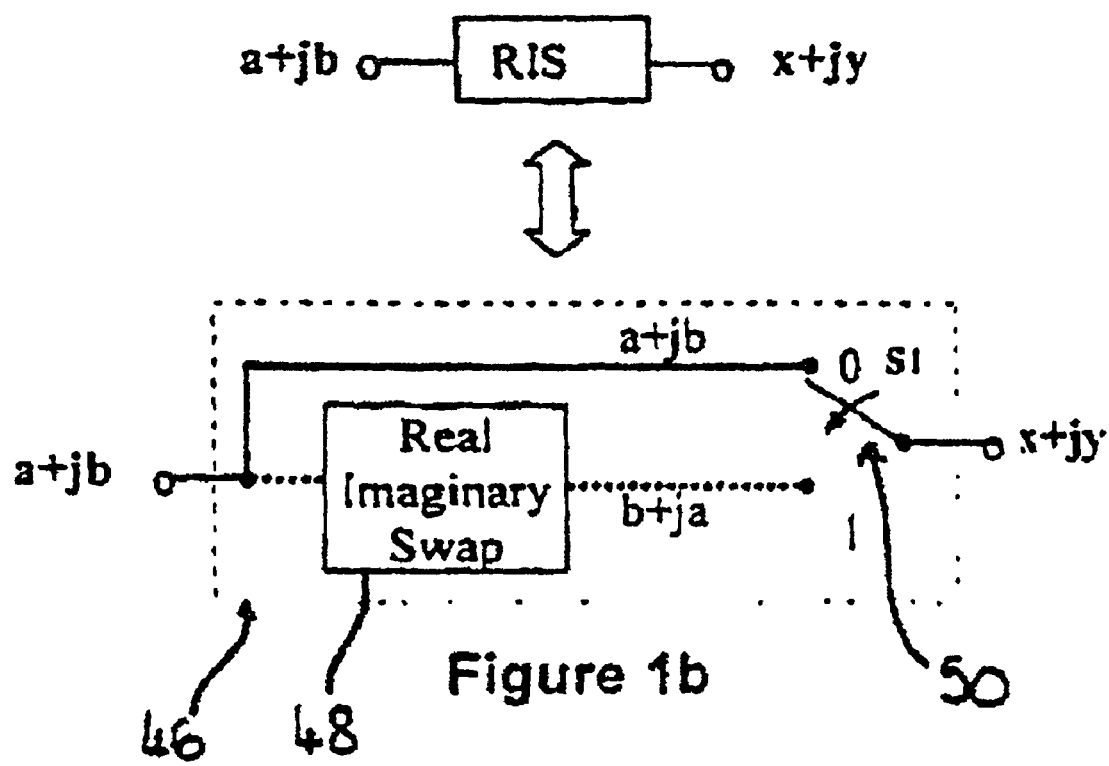

The real/imaginary swap units 2, 46 used in FIG. 1a comprise a swap unit 48 and a changeover switch 50 as shown in FIG. 1b. The input to the swap unit 46 consists of a complex signal (a+jb) and this signal is taken to a first contact of the changeover switch 50 and to the input of the swap unit 48. The output signal of the swap unit 48 may be denoted as b+ja and is connected to the second contact of the changeover switch 50. The wiper of the changeover switch 50 is taken to the output of the unit and may be denoted as x+jy.

The changeover switches 18a-18h, 40a-40d, and 50 in FIGS. 1a and 1b are preferably electronic switches rather than mechanical switches.

Figure 1C:
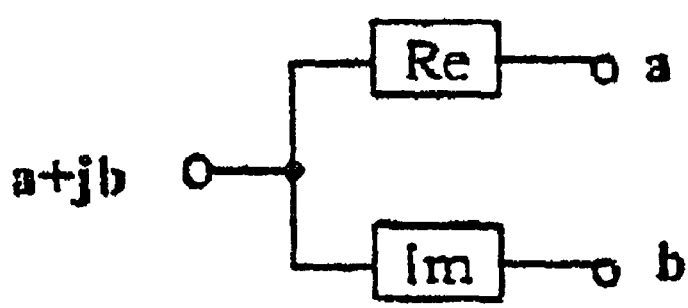

FIG. 1c shows one of the two sets of selection stages in the fifth stage 10 of FIG. 1a for dividing the complex input signal into real and imaginary part, to provide two output signals, the first output signal corresponding to the real component of the signal and the second output signal corresponding to the imaginary component of the signal.

The processor 1 of FIG. 1a may be operated in several modes. With the all of the changeover switches 18a-18h and 40a-40d in the various stages being set to a first position, the processor 1 acts as an FFT system. With the switches 50 in the real/imaginary swap units 2, 46 being set to a second position, and with the switches 18a-18h and 40a-40d in the third and fifth stages 6, 10 being set to the first position, the processor 1 will operate as an IFFT system. If the input signal is in the form of a complex conjugate symmetrical signal, then the switches 18a-18h and 40a-40d in the third and fifth stages 6,10 may be set to the second position and the third and fourth processing units 30c and 30d may be turned off. The first position is with the wiper of the switches 18a-18h and 40a-40d being connected to the first contact and the second position is with the wipers being connected to the second contact of the switch.

Figure 2:
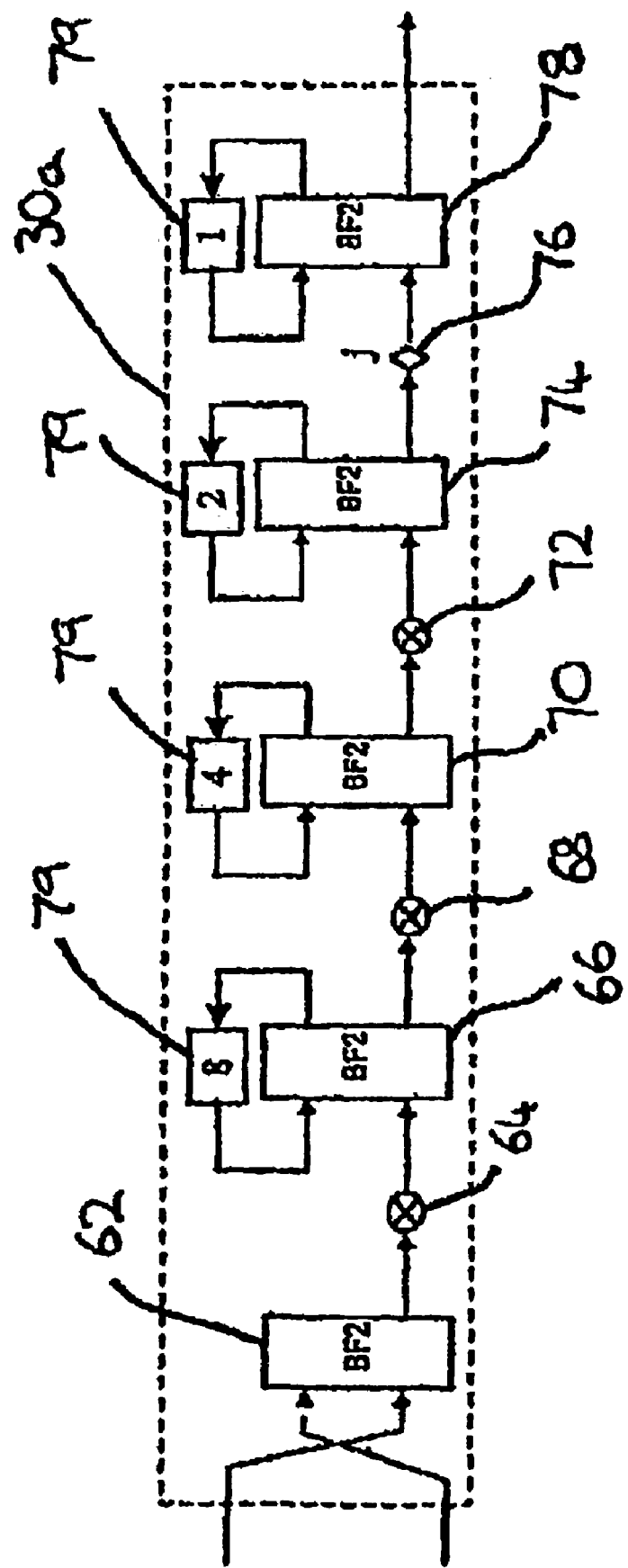

The pipelined processor used in the system of FIG. 1a may be one of a number of types of processor and FIG. 2 shows an example of a suitable pipelined processor using the R2SDF technique which is described in the publication by E. H. Wold and A. M. Despain entitled "Pipeline and parallel-pipeline FFT processors for VLSI implementation," published as IEEE Trans. Comput., vol. C-33, no. 5, pp. 414-426, May 1984. The processor consists of a number of radix-2 butterfly units connected in cascade. The first butterfly element 62 in each processing unit 30a, 30b, 30c, 30d has two inputs which are connected to an output from each of the butterfly elements 14, 16 in the second stage 4. The output of the first butterfly element 62 in each processing unit 30a, 30b, 30c, 30d is connected via a multiplier stage 64 to the input of a second radix-2 butterfly element 66. Similarly, the output of the second butterfly element 66 in each processing unit 30a, 30b, 30c, 30d is connected via a multiplier stage 68 to the input of a third radix-2 butterfly element 70, and the output of the third radix-2 butterfly element 70 is connected via a multiplier stage 72 to the input of a fourth radix-2 butterfly element 74. The output of the fourth radix-2 butterfly element 74 is connected via an imaginary unit (j) stage 76 to a fifth radix-2 butterfly element 78. Each of the second, third, fourth and fifth radix-2 butterfly elements 66, 70, 74 and 78 has a shift register memory 79 for intermediate storage of data.

In the system of FIG. 1a, the four pipelined processor units 30a, 30b, 30c, 30d are identical both in architecture and implementation.

Figure 3A:
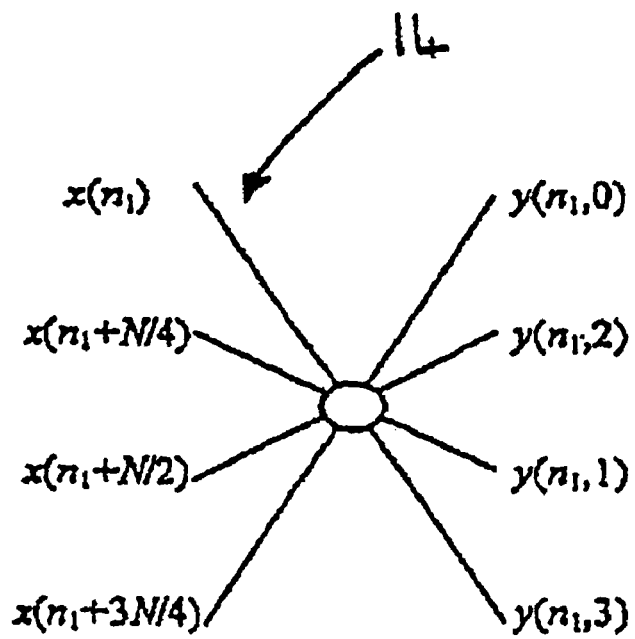
Figure 3B:
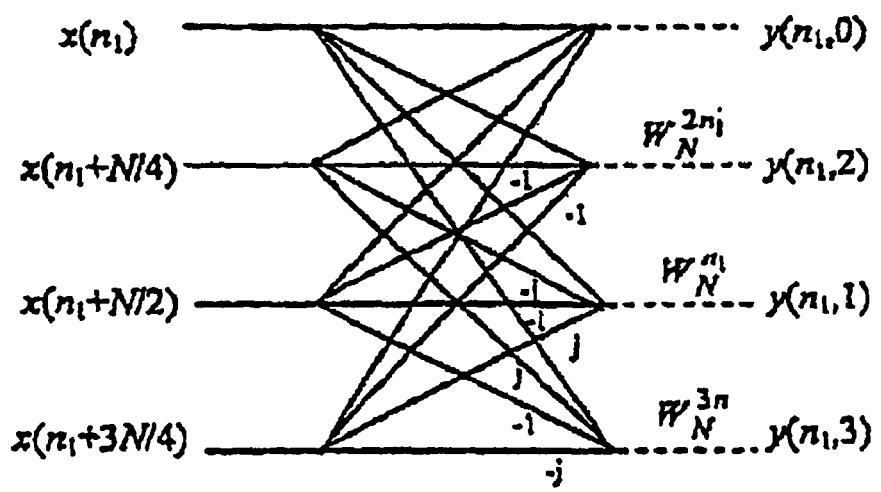

The radix-4 butterfly operation performed by each of the radix-4 butterflies of the second stage 4 is shown in FIGS. 3a and 3b. FIG. 3a is a generalized representation and FIG. 3b shows the internal connections which each input contributes to each output. Each radix-4 butterfly element is configured to receive four inputs concurrently and to generate and deliver concurrently four calculation results according to radix-4 butterfly operations for performing FFT calculations. The radix-4 butterfly operation may be derived as follows: Mathematically, the N-point discrete FFT/IFFT pair is defined as $$X(k) = \sum_{n=0}^{N-1} x(n) \cdot W_N^{kn} \quad k = 0, 1 \ldots, N-1 \quad (1)$$

$$x(n) = \frac{1}{N} \sum_{k=0}^{N-1} X(k) \cdot W_N^{-kn} \quad n = 0, 1, \ldots, N-1 \quad (2)$$

where $W_N = e^{-j2\pi/N}$. In this definition, both x(n) and X(k) are assumed to be complex. From Equation (2), it may be derived that:

$$(-j) \cdot x^*(n) = \frac{1}{N} \sum_{k=0}^{N-1} [(-j)X^*(k)] \cdot W_N^{kn} \quad n = 0, 1, \ldots, N-1 \quad (3)$$

where (·)* denotes conjugate. Equations (1) and (3) suggest the possibility of using the same architecture to perform IFFT and FFT. With no consideration of the scaling factor 1/N, which may be absorbed into the input or output in practice, the IFFT may be achieved by performing FFT with real and imaginary swapped input and real and imaginary swapped output. This duality property of FFT and IFFT may be used in the actual implementation of OFDM systems where the IFFT processor and the FFT processor share the same hardware due to the simplex communication nature of those systems.

For convenience of explanation and without loss of generality, the following discussion focuses on the architecture development for FFT processing. In order to achieve a parallel pipelined architecture, in Equation (1), let $$n = n_1 + \frac{N}{4}n_2, \ 0 \le n_1 < \frac{N}{4} \text{ and } 0 \le n_2 < 4 \quad (4)$$

$$k = 4k_1 + k_2 \quad 0 \le k_1 < \frac{N}{4} \text{ and } 0 \le k_2 < 4$$

then:

$$X(4k_1 + k_2) = \sum_{n_1=0}^{\frac{N}{4}-1} y(n_1, k_2) \cdot W_{N/4}^{k_1 n_1} \quad (5)$$

$$= \sum_{n_1=0}^{\frac{N}{4}-1} \left\{ \begin{bmatrix} x(n_1) + \\ x\left(n_1 + \frac{N}{4}\right) \cdot W_N^{k_2 N/4} + \\ x\left(n_1 + \frac{N}{2}\right) \cdot W_N^{k_2 N/2} + \\ x\left(n_1 + \frac{3N}{4}\right) \cdot W_N^{3k_2 N/4} \end{bmatrix} \cdot W_N^{k_2 n_1} \right\} \cdot W_{N/4}^{k_1 n_1}.$$

An N-point FFT has been decomposed into four independent N/4-point FFTs. The inputs of $k_2^{th}$ ($k_2$=0, 1, 2, 3) N/4-point FFT are $y(n_1, k_2)$, for $n_1$=0 to N/4-1, which are the results in the radix-4 butterfly operation as shown in FIGS. 3a and 3b. Based on this decomposition, the VLSI implementation of FFT processor in the OFDM UWB system can adopt a mixed-radix, parallel and pipelined architecture, as shown in FIG. 1a. Flexibility has been given to the implementation of the pipelined processors 30a, 30b, 30c, 30d.

One of the advantageous features of this preferred embodiment is that, when the input data of the processor 1 are complex conjugate symmetrical, a considerable amount of power saving may be achieved with addition of a very simple control mechanism to the normal processor.

When the input data of the processor are complex conjugate symmetrical, in the OFDM UWB system, to maximize frequency-diversity, frequency-domain spreading within an OFDM symbol may be employed as described in the publication by the MultiBand OFDM Alliance (MBOA) Special Interest Group (SIG)/WiMedia Alliance, Inc. (WiMedia) in www.wimedia.com entitled "MultiBand OFDM Physical Layer Proposal for IEEE 802.15.3a," September 2004. Frequency-domain spreading entails transmitting the same information (complex number) on two separate subcarriers within the same OFDM symbol. More specifically, when the PHY header within each packet or the packet payload with lower data rate (53.3 Mbps or 80 Mbps) is processed, the input data of the IFFT processor are set to be complex conjugate symmetrical.

Figure 4:
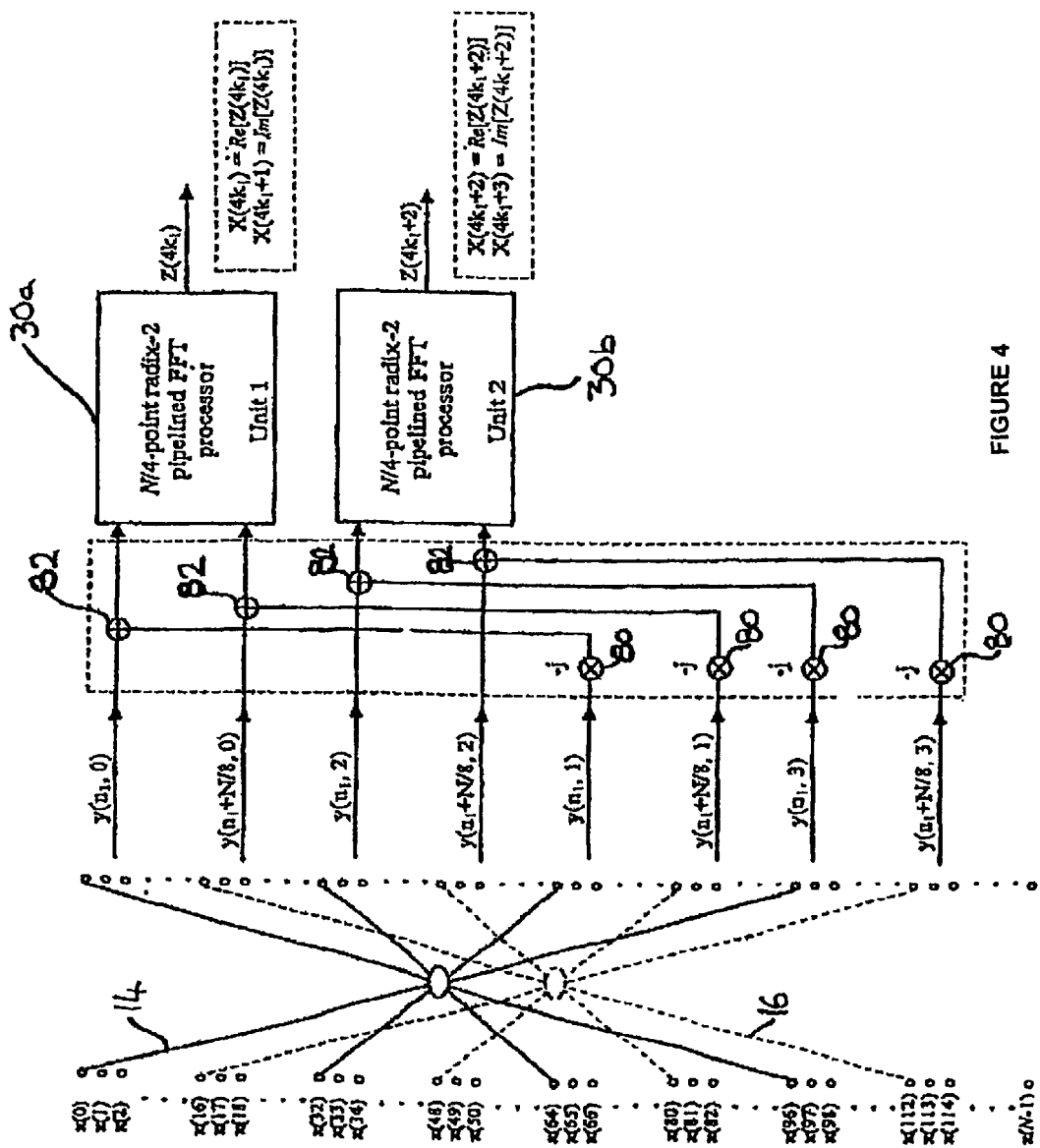
FIG. 4 is a schematic diagram showing the parallel and pipelined architecture with $n_1=0$ to N/4 and $k_1=0$ to N/4 according to a further preferred embodiment of the invention.

In the preferred embodiment shown in FIG. 4, two of the pipelined processor units 30c, 30d of the system of FIG. 1a may be completely turned off to save power consumption. FIG. 4 shows a preferred embodiment of the invention in which two of the pipelined processor units have been turned off when the input data of the processor 1 are complex conjugate symmetrical. In the OFDM UWB system, N=128, n1=0 to N/4, and $k_1$=0 to N/4. In this embodiment, the two inputs which, in the embodiment of FIG. 1a were applied to the processor unit 30c which has been turned off in the system of FIG. 4, are multiplied by the sign reversed imaginary unit (−j) 80 and are then added to the input of the processing unit 30a which has not been turned off and, similarly, the two inputs which, in the embodiment of FIG. 1a were applied to the processor unit 30d which has been turned off in the system of FIG. 4, are multiplied by the sign reversed imaginary unit (−j) stage 82 and are then added to the input of the processing unit 30b which has not been turned off.

The complex conjugate symmetry of the input data of the processor may be defined as:

$$x(k) = x^*(N-k), \quad 1 \le k \le \frac{N}{2} - 1 \quad (6)$$

where x(0) and $$x\left(\frac{N}{2}\right)$$

are real.

(Note that, here, due to the duality property of FFT and IFFT, the FFT processor has been used for explanation, albeit the final solution is presented for IFFT processing in the OFDM UWB system).

If the input data are complex conjugate symmetrical, the output data of the FFT will all be real values. Thus, Equation (1) may be modified as $$X(k) = \mathrm{Re}[X(k)] = \sum_{n=0}^{N-1} x(n) \cdot W_N^{kn} \quad (7)$$

$$k = 0, 1, \ldots, N-1$$

where Re[·] denotes the real part of a complex value. Following Equation (7), another FFT operation may be defined as $$Z(k) = \sum_{n=0}^{N-1} [x(n) \cdot (1 + j \cdot e^{-j2\pi n/N})] \cdot W_N^{kn} \quad (8)$$

$$k = 0, 1, \ldots, N-1$$

From Equation (8), $$Z(2k) = \sum_{n=0}^{N-1} x(n) \cdot W_N^{2kn} + j \cdot \sum_{n=0}^{N-1} x(n) \cdot W_N^{(2k+1)n} \quad (9)$$

$$= X(2k) + j \cdot X(2k+1)$$

$$= \mathrm{Re}[X(2k)] + j \cdot \mathrm{Re}[X(2k+1)], \quad k = 0, 1, \ldots, \frac{N}{2} - 1.$$

Equation (9) implies that N real values of X(k), for k=0 to N−1, may be obtained by computing N/2 complex values of Z(2k), for k=0 to N/2−1, i.e., $$\begin{cases} X(2k) = \mathrm{Re}[X(2k)] = \mathrm{Re}[Z(2k)], \\ X(2k+1) = \mathrm{Re}[X(2k+1)] = \mathrm{Im}[Z(2k)] \end{cases} \quad (10)$$

$$k = 0, 1, \ldots, \frac{N}{2} - 1,$$

where Im [·] denotes the imaginary part of a complex value.

To obtain Z(2k), for k=0, to N/2−1, using the proposed FFT processor, Equations (5) and (9) may be combined to give:

$$\begin{cases} Z(4k_1) = \sum_{n_1=0}^{N/4-1} [y(n_1, 0) + j \cdot y(n_1, 1)] \cdot W_{N/4}^{k_1 n_1} \\ Z(4k_1 + 2) = \sum_{n_1=0}^{N/4-1} [y(n_1, 2) + j \cdot y(n_1, 3)] \cdot W_{N/4}^{k_1 n_1} \end{cases} \quad (11)$$

$$k_1 = 0, 1, \ldots, \frac{N}{4} - 1$$

With Equations (10) and (11), the processor architecture may be simplified such that the redundant operations may easily be shut down once the input data become complex conjugate symmetrical.

Thus, as shown in FIG. 4, a large power saving may be achieved, with very minor modification to the basic system and processing of the embodiment shown in FIG. 1a.

It should be noted that, when comparing Equation (11) and FIG. 4, "−j" has been used in FIG. 4 instead of "j" in Equation (11). The difference comes from the fact that only IFFT processing needs to deal with the complex conjugate symmetrical input in the OFDM UWB system whereas the above-mentioned derivations are based on FFT processing as emphasized above.

Various modifications to the embodiments of the present invention described above may be made. For example, other components and method steps can be added or substituted for those above. Thus, although the invention has been described above using particular embodiments, many variations are possible within the scope of the claims, as will be clear to the skilled reader, without departing from the scope of the invention.

The invention claimed is:

1. A processor for performing a Fast Fourier Transform (FFT) and/or an Inverse Fast Fourier Transform (IFFT) of a complex input signal having a real component and an imaginary component, the processor comprising:
   a first stage for passing the input signal to a second stage when a Fast Fourier Transform procedure is to be performed and for swapping the real and imaginary components of the complex input signal before passing the signal to a second stage if an Inverse Fast Fourier Transform procedure is to be performed; the first stage having an input and an output;
   the second stage comprising a first radix-4 butterfly element and a second radix-4 butterfly element; the output of the first stage being connectable to an input of the second stage;
   a third stage for switching between a first operating mode and a second operating mode, the second operating mode being for processing a complex conjugate symmetrical input signal;
   a fourth stage comprising a plurality of processing units to provide a processed signal comprising a real component and an imaginary component, one or more of said processing units comprising a radix-2 pipelined Fast Fourier Transform (FFT) processor;
   a fifth stage for switching with the third stage between the first operating mode and the second operating mode; the fifth stage having an input couplable to an output of the fourth stage and an output;
   a sixth stage for passing the signal received from the output of the fifth stage if a Fast Fourier Transform procedure is performed and for swapping the real and imaginary components of the signal received from the output of the fifth stage before passing the signal to an output of the sixth stage if an Inverse Fast Fourier Transform procedure is performed; wherein:
   a first input to the third stage being couplable to an output of the first butterfly element; a first output to the third stage being couplable to a first input of one or more of the plurality of processing units; and a second input to one or more of the plurality of processing units being couplable through the third stage to an output of the second butterfly element;
   the first and second radix-4 butterfly elements being arranged to perform a butterfly operation on the complex input signal to generate and deliver one or more components of a processed signal to the fourth stage through the third stage;
   the fourth stage being arranged to process the processed signal received from the third stage according to a Fast Fourier Transform (FFT) processing procedure to produce an output signal.

2. A processor according to claim 1, wherein the fourth stage comprises a first processing unit, and a second processing unit.

3. A processor according to claim 2, wherein the fourth stage further comprises a third processing unit, and a fourth processing unit.

4. A processor according to claim 2, wherein the input signal is a complex conjugate symmetrical signal, and wherein the third stage of the processor further comprises:
   a first multiplier stage, the first multiplier stage being arranged to receive a first output signal from the first butterfly element;
   a first summing stage, the first summing stage being arranged to receive an output signal from the first multiplier stage and to add the output signal from the first multiplier stage to a second output signal from the first butterfly element to form a first summed signal; wherein the first processing unit has a first input for receiving the first summed signal;
   a second multiplier stage, the second multiplier stage being arranged to receive a first output signal from the second butterfly element;
   a second summing stage, the second summing stage being arranged to receive an output signal from the second multiplier stage and to add the output signal from the second multiplier stage to a second output signal from the second butterfly element to form a second summed signal; wherein the first processing unit has a second input for receiving the second summed signal.

5. A processor according to claim 4, the third stage of the processor further comprising:
   a third multiplier stage, the third multiplier stage being arranged to receive a third output signal from the first butterfly element;
   a third summing stage, the third summing stage being arranged to receive an output signal from the third multiplier stage and to add the output signal from the third multiplier stage to a fourth output signal from the first butterfly element to form a third summed signal; wherein the second processing unit has a first input for receiving the third summed signal;
   a fourth multiplier stage, the fourth multiplier stage being arranged to receive a third output signal from the second butterfly element;
   a fourth summing stage, the fourth summing stage being arranged to receive an output signal from the fourth multiplier stage and to add the output signal from the fourth multiplier stage to a fourth output signal from the second butterfly element to form a fourth summed signal; wherein the second processing unit has a second input for receiving the fourth summed signal.

6. A processor according to claim 5, wherein the fifth stage is arranged to select the real component and the imaginary component from the processed signal output from the first processing unit and the real component and the imaginary component from the processed signal output from the second processing unit, the selected real and imaginary components forming the outputs from the processor.

7. A processor according to claim 1, wherein two or more of the processing units of the fourth stage are identical.

8. A processor according to claim 1, wherein one or more of the processing units comprise a plurality of cascaded radix-2 butterfly elements.

9. A processor according to claim 8, wherein one or more of the plurality of cascaded radix-2 butterfly elements have one or more shift register memories.

10. A processor according to claim 9, wherein two or more of the plurality of radix-2 butterfly elements are separated by a multiplier stage.

11. A processor according to claim 10, wherein two or more of the plurality of radix-2 butterfly elements are separated by an imaginary unit stage.

12. A method for performing a Fast Fourier Transform (FFT) and/or an Inverse Fast Fourier Transform (IFFT) of a complex input signal having a real component and an imaginary component, the method comprising:

applying the complex input signal to a first stage and when a Fast Fourier Transform procedure is to be applied passing the input signal to a second stage, and when an Inverse Fast Fourier Transform procedure is to be applied swapping the real and imaginary components of the complex input signal before passing the signal to a second stage;

applying in a second stage a first portion of the signal output from the first stage to a radix-4 butterfly element;

applying in the second stage a second portion of the signal output from the first stage to a second radix-4 butterfly element;

performing a butterfly operation in each of the first and second radix-4 butterfly elements on the respective portions of the signal to generate in each of the butterfly elements a processed output signal;

applying the processed output signal from the first butterfly element to a first input to a third stage, the third stage being arranged to switch between a first operating mode and a second operating mode, the second operating mode being for processing a complex conjugate symmetrical input signal;

applying the processed output signal from the second butterfly element to a second input to the third stage;

applying an output signal from the third stage derived from the first output from the first butterfly element to a first input to one or more of a plurality of processing units in a fourth stage, one or more of said processing units comprising a radix-2 pipelined Fast Fourier Transform (FFT) processor; and applying an output signal from the third stage derived from the first output from the second butterfly element to a second input to one or more of the plurality of processing units;

processing in the fourth stage the processed output signals received from the first and second butterfly elements according to a Fast Fourier Transform (FFT) processing procedure to produce a processed output signal;

applying the processed output signal to a fifth stage arranged for switching with the third stage between the first operating mode and the second operating mode;

applying the signal output from the fifth stage to a sixth stage, passing the signal output from the fifth stage to an output of the sixth stage if a Fast Fourier Transform procedure is performed and swapping the real and imaginary component of the complex signal output from the fifth stage before passing the signal to an output of the sixth stage if an Inverse Fast Fourier Transform is performed to produce an output signal.

13. A method according to claim 12, wherein the step of applying the output signals from the first and second butterfly elements comprises applying the output signals to a first processing unit and a second processing unit.

14. A method according to claim 13, wherein the step of applying the output signals from the first and second butterfly elements further comprises applying the output signals to a third processing unit, and a fourth processing unit.

15. A method according to claim 12, wherein the step of applying the processed output signals to one or more of a plurality of processing units comprises applying the signals to two or more identical processing units.

16. A method according to claim 12, wherein the step of applying the processed output signals to one or more of a plurality of processing units comprises applying the signals to one or more of the processing units comprising a plurality of cascaded radix-2 butterfly elements.

17. A method according to claim 16, further comprising applying a signal output from one or more of the plurality of cascaded radix-2 butterfly elements to one or more shift register memories.

18. A method according to claim 17, further comprising multiplying the signal output from one or more of the plurality of radix-2 butterfly elements by an imaginary unit before applying it to a further one of said radix-2 butterfly elements.

19. A method according to claim 12, wherein the input signal is a complex conjugate symmetrical signal, the step of applying the signal to the third stage further comprising:

applying a first output signal from the first butterfly element to a first multiplier stage;

applying to a first summing stage an output signal from the first multiplier stage;

adding the output signal from the first multiplier stage to a second output signal from the first butterfly element to form a first summed signal;

applying the first summed signal to a first input of the first processing unit;

applying a first output signal from the second butterfly element to a second multiplier stage;

applying to a second summing stage an output signal from the second multiplier stage;

adding the output signal from the second multiplier stage to a second output signal from the second butterfly element to form a second summed signal; and applying the second summed signal to a second input of the first processing unit.

20. A method according to claim 19, the step of applying the signal to the third stage further comprising:

applying to a third multiplier stage a third output signal from the first butterfly element;

applying to a third summing stage an output signal from the third multiplier stage;

adding the output signal from the third multiplier stage to a fourth output signal from the first butterfly element to form a third summed signal;
applying to a first input of the second processing unit the third summed signal;
applying to a fourth multiplier stage a third output signal from the second butterfly element;
applying to a fourth summing stage an output signal from the fourth multiplier stage;
adding the output signal from the fourth multiplier stage to a fourth output signal from the second butterfly element to form a fourth summed signal; and
applying to a second input of the second processing unit the fourth summed signal.

21. A method according to claim 20, wherein the method further comprises selecting in the fifth stage the real component and the imaginary component from the processed signal output from the first processing unit and the real component and the imaginary component from the processed signal output from the second processing unit, the selected real and imaginary components forming output signals.

* * * * *

UNITED STATES PATENT AND TRADEMARK OFFICE
CERTIFICATE OF CORRECTION

PATENT NO. : 7,818,360 B2  
APPLICATION NO. : 11/643936  
DATED : October 19, 2010  
INVENTOR(S) : Wang et al.

Page 1 of 1

It is certified that error appears in the above-identified patent and that said Letters Patent is hereby corrected as shown below:

On the cover page:

Under the subheading "(75) Inventors:" lines 1-6, replace all instances of "Singapore (CN)" with --Singapore (SG)--.

Signed and Sealed this
Eighth Day of February, 2011

David J. Kappos
*Director of the United States Patent and Trademark Office*